(12) United States Patent
Hasegawa et al.

(10) Patent No.: US 11,986,964 B2
(45) Date of Patent: May 21, 2024

(54) PATH DETERMINATION DEVICE, ROBOT, AND PATH DETERMINATION METHOD

(71) Applicant: HONDA MOTOR CO., LTD., Tokyo (JP)

(72) Inventors: Yuji Hasegawa, Saitama (JP); Sango Matsuzaki, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 391 days.

(21) Appl. No.: 17/417,585

(22) PCT Filed: Aug. 7, 2019

(86) PCT No.: PCT/JP2019/031194
§ 371 (c)(1),
(2) Date: Jun. 23, 2021

(87) PCT Pub. No.: WO2020/136977
PCT Pub. Date: Jul. 2, 2020

(65) Prior Publication Data
US 2022/0055215 A1    Feb. 24, 2022

(30) Foreign Application Priority Data

Dec. 27, 2018 (JP) ................. 2018-245254

(51) Int. Cl.
B25J 9/16    (2006.01)
(52) U.S. Cl.
CPC ............. B25J 9/1666 (2013.01); B25J 9/161 (2013.01); B25J 9/163 (2013.01); B25J 9/1697 (2013.01)
(58) Field of Classification Search
CPC ... B25J 9/166; B25J 9/161; B25J 9/163; B25J 9/1697
See application file for complete search history.

(56) References Cited

U.S. PATENT DOCUMENTS

| 11,014,238 B2* | 5/2021 | Paschall, II ............. G08G 1/00 |
| 2010/0222954 A1* | 9/2010 | Ichinose ............. G05D 1/0246 |
| | | 700/255 |

(Continued)

FOREIGN PATENT DOCUMENTS

| CN | 107168342 A | 9/2017 |
| CN | 107272680 A | 10/2017 |

(Continued)

OTHER PUBLICATIONS

International Search Report, dated Oct. 21, 2019, 1 page.
Chinese Office Action dated Sep. 1, 2023, Chinese Application 201980081928.8, English translation included, 16 pages.

(Continued)

*Primary Examiner* — Peter D Nolan
*Assistant Examiner* — Mikko Okechukwu Obioha
(74) *Attorney, Agent, or Firm* — Rankin, Hill & Clark LLP (57) ABSTRACT

A path determination device and so forth are provided which can determine a path of a robot such that an autonomous mobile robot smoothly moves to a destination while avoiding an interference with a traffic participant even under a traffic environment such as a crowd. A path determination device (1) determines a temporary moving velocity command v_cnn, by using a CNN, such that an interference between a robot (2) and a traffic participant is avoided and determines a moving velocity command v of the robot (2), by using a DWA, such that in a case where the robot (2) is assumed to move from a present position by the temporary moving velocity command v_cnn, an objective function G(v) including a distance dist to the traffic participant closest to the robot (2) and the temporary moving velocity command v_cnn of the robot (2) as independent variables becomes a maximum value.

4 Claims, 10 Drawing Sheets

(56) References Cited

U.S. PATENT DOCUMENTS

2010/0235033 A1  9/2010  Yamamoto et al.
2020/0081442 A1  3/2020  Kizumi
2021/0154840 A1* 5/2021  Vogel .................... B25J 9/1666

FOREIGN PATENT DOCUMENTS

| CN | 107643752 A | 1/2018 |
| CN | 108255182 A | 7/2018 |
| JP | 2008-065755 | 3/2008 |
| JP | 2009-110495 | 5/2009 |
| JP | 2017-084110 A | 5/2017 |
| WO | 2013/171905 | 11/2013 |
| WO | 2018/220853 A1 | 4/2020 |

OTHER PUBLICATIONS

Notice of Written Opposition dispatched on Nov. 8, 2023 by the Japan Patent Office and the Notice of Dispatach of Duplicates of a Written Opposition Nov. 8, 2023 along with its English translation for corresponding Japanese Patent No. 7258046 (Application No. 2020-562334), English abstract included, 33 pages.

Notice of Reasons for Revocation issued Dec. 15, 2023, Japanese Application No. 2020-562334, English translation included, 13 pages.

"RGB-D and laser data fusion-based human detection and tracking for socially aware robot navigation framework", Xuan-Tung Truong et al., Proceeding of the 2015 IEEE Conference on Robotics and Biomimetics, Zhuhai, China, Dec. 6-9, 2015, 7 pages.

"The Dynamic Window Approach to Collision Avoidance", IEEE Robotics & Automation Magazine, Mar. 1997, pp. 23-33, 13 pages.

* cited by examiner

FIG.7
FIRST PATTERN

FIG.8
SECOND PATTERN

FIG.9
THIRD PATTERN

FIG.10
FOURTH PATTERN

FIG.11
FIFTH PATTERN

FIG.12
SIXTH PATTERN

FIG.13
SEVENTH PATTERN

PATH DETERMINATION DEVICE, ROBOT, AND PATH DETERMINATION METHOD

TECHNICAL FIELD

The present invention relates to a path determination device and so forth which determine a path of an autonomous mobile robot.

BACKGROUND ART

In related art, as a path determination device which determines a path of an autonomous mobile robot, a device has been known which is disclosed in Patent Literature 1. In this path determination device, a possible interference time in which a robot is predicted to possibly interfere with a traffic participant is calculated based on a velocity of a traffic participant such as a pedestrian, and a virtual obstacle region is calculated to which the traffic participant is assumed to move a predetermined time later. Then, a path of the robot is determined based on the possible interference time and the virtual obstacle region. Accordingly, an interference between the robot and the traffic participant is avoided.

CITATION LIST

Patent Literature

Patent Literature 1: Japanese Patent Laid-Open No. 2009-110495

SUMMARY OF INVENTION

Technical Problem

In the above path determination device in related art, due to use of a possible interference time of a traffic participant and a virtual obstacle region, when an actual traffic participant such as a pedestrian moves in an unpredictable locus, an interference state between a robot and a traffic participant frequently occurs. As a result, there is a problem that a stop state of the robot frequently occurs and merchantability becomes low. In particular, this problem becomes significant under a traffic environment in which a crowd is present.

The present invention has been made to solve the above problem, and an object is to provide a path determination device and so forth that can determine a path of a robot such that an autonomous mobile robot smoothly moves to a destination while avoiding an interference with a traffic participant even under a traffic environment such as a crowd.

Solution to Problem

To achieve the above object, the present invention provides a path determination device which determines a path in a case where an autonomous mobile robot moves to a destination under a condition in which a traffic participant including a pedestrian is present in a traffic environment to the destination, the path determination device including: a predicted path determination unit which determines a predicted path as a predicted value of a path of the robot, by using a predetermined prediction algorithm, such that an interference between the robot and the traffic participant is avoided; and a path determination unit which determines the path of the robot, by using a predetermined control algorithm, such that in a case where the robot is assumed to move in the predicted path from a present position, an objective function including a distance to the traffic participant closest to the robot and a velocity of the robot as independent variables becomes a maximum value.

In this path determination device, the predicted path as the predicted value of the path of the robot is determined by using the predetermined prediction algorithm such that an interference between the robot and the traffic participant is avoided. Furthermore, the path of the robot is determined by using the predetermined control algorithm such that in a case where the robot is assumed to move in the predicted path from the present position, the objective function including the distance to the traffic participant closest to the robot and the velocity of the robot as the independent variables becomes the maximum value. As described above, in a case where the path of the robot is determined such that the objective function including the distance to the traffic participant closest to the robot and the velocity of the robot as the independent variables becomes the maximum value, the path of the robot can be determined while the distance to the traffic participant and the moving velocity of the robot are secured as much as possible and in a proper balance.

Accordingly, even under a traffic condition such as a crowd in which an error in the predicted path becomes large, the path of the robot can be determined such that the autonomous mobile robot smoothly moves to the destination while avoiding interferences with traffic participants. As a result, merchantability of the robot can be improved (note that "determining a path of a robot" in the present specification includes sequentially determining a value representing a moving direction and a moving velocity of a robot (for example, a moving velocity command described later) in a predetermined control cycle, and "traffic participant" in the present specification includes immovable obstacles in addition to movable objects such as pedestrians and vehicles).

In the present invention, the predetermined control algorithm is preferably an algorithm to which a dynamic window approach is applied.

In general, compared to other methods, the dynamic window approach has characteristics capable of shortening a time needed for path determination for the robot and of reducing a computation load. Consequently, in this path determination device, by using the algorithm to which the dynamic window approach is applied, the path of the robot can be determined while realizing shortening of the time needed for path determination and reduction in the computation load.

To achieve the above-described object, a robot of the present invention includes: the path determination device; and a control unit which controls a movement mechanism of the robot such that the robot moves in a path determined by the path determination device.

This robot can smoothly move to the destination while avoiding an interference with a traffic participant.

To achieve the above-described object, the present invention provides a path determination method of determining a path in a case where an autonomous mobile robot moves to a destination under a condition in which a traffic participant including a pedestrian is present in a traffic environment to the destination, the path determination method including:

determining a predicted path as a predicted value of a path of the robot, by using a predetermined prediction algorithm, such that an interference between the robot and the traffic participant is avoided; and determining the path of the robot, by using a predetermined control algorithm, such that in a case where the robot is assumed to move in the predicted path from a present position, an objective function including a distance to the traffic participant closest to the robot and a velocity of the robot as independent variables becomes a maximum value.

DESCRIPTION OF EMBODIMENT

Figure 1:
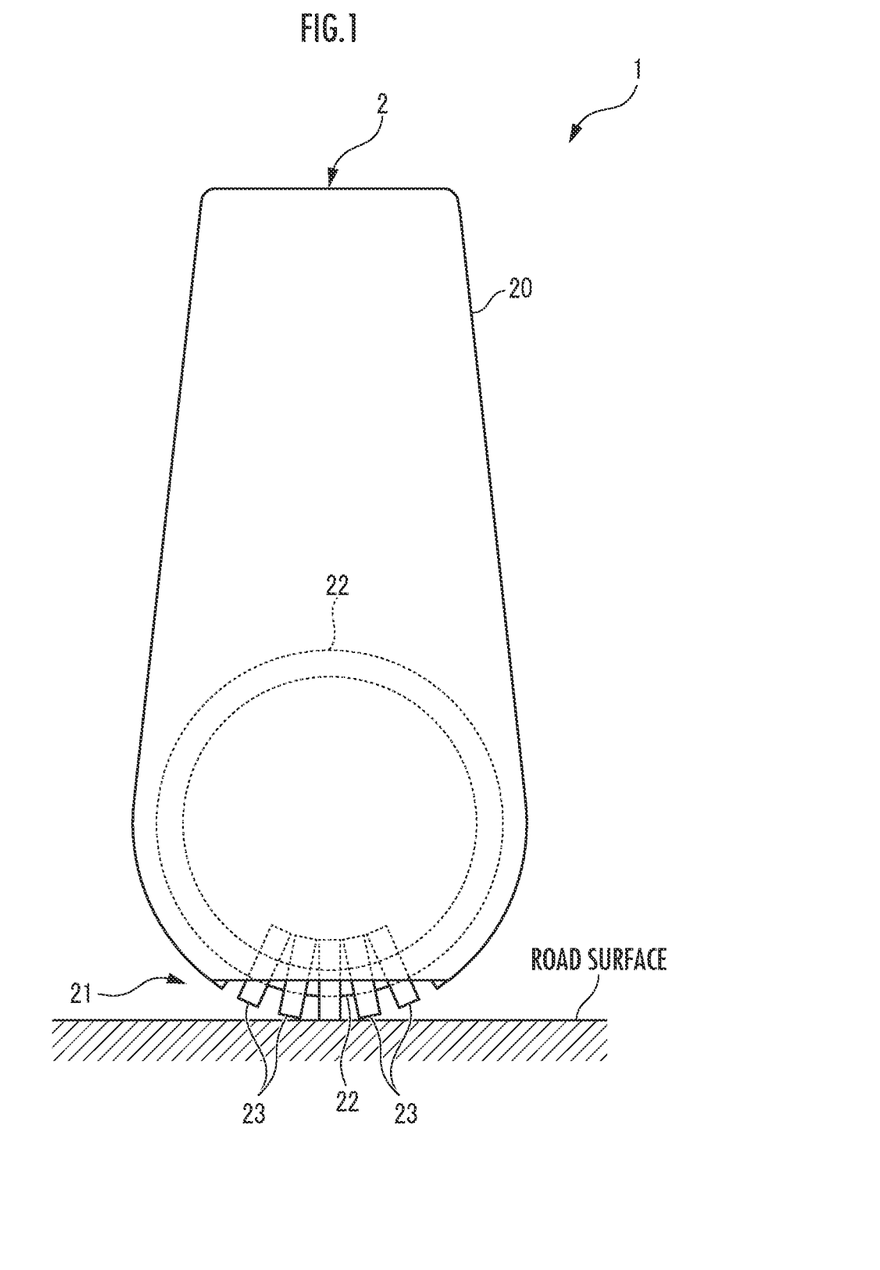
FIG. 1 is a diagram illustrating an external appearance of a robot to which a path determination device according to one embodiment of the present invention is applied.

A path determination device according to one embodiment of the present invention will hereinafter be described with reference to drawings. As illustrated in FIG. 1, a path determination device 1 of the present embodiment is applied to an inverted pendulum robot 2 and determines a path of the robot 2 by a procedure described later under a condition in which an existence probability of traffic participant is high.

Figure 2:
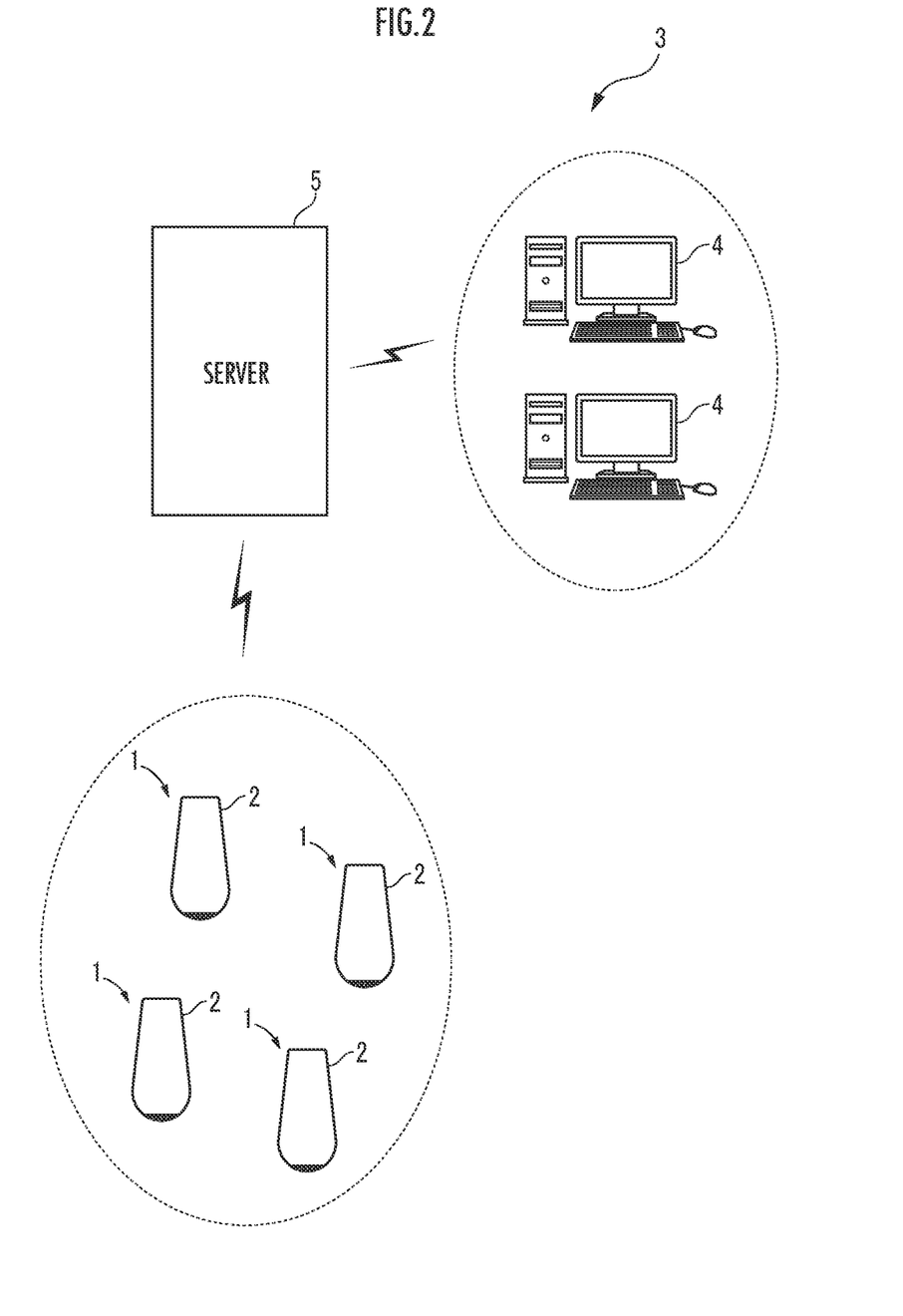
FIG. 2 is a diagram illustrating a configuration of a guiding system by robots.

This robot 2 is of an autonomous mobile type and is used in a guiding system 3 illustrated in FIG. 2. This guiding system 3 is a system in a form in which the robot 2 guides a user to his/her destination (for example, a store or a boarding gate) while leading the user in a shopping mall, an airport, or the like.

As illustrated in FIG. 2, the guiding system 3 includes plural robots 2 autonomously moving in a predetermined region, input devices 4 which are separately provided from the plural robots 2 and to which destinations of users are input, and a server 5 capable of wirelessly and mutually communicating with the robots 2 and the input devices 4.

The input device 4 is of a personal computer type and transmits a wireless signal indicating a destination of a user to the server 5 when the destination of the user is input by an operation on a mouse and a keyboard by the user (or an operator). When the server 5 receives the wireless signal from the input device 4, the server 5 sets the destination itself of the user or a relay point on the way to the destination based on map data stored therein as a destination Pobj and transmits a destination signal indicating that to the robot 2.

As described later, when a control device 10 in the robot 2 receives the destination signal from the server 5 via a wireless communication device 14, the control device 10 reads in the destination Pobj included in the destination signal and determines a path to this destination Pobj.

Next, a mechanical configuration of the robot 2 will be described. As illustrated in FIG. 1, the robot 2 includes a body 20, a movement mechanism 21 provided in a lower portion of the body 20, and so forth and is configured to be capable of moving in all bearings on a road surface by this movement mechanism 21.

Because this movement mechanism 21 is configured similarly to, specifically, a mechanism of Japanese Patent Laid-Open No. 2017-56763, for example, although a detailed description thereof will not be made here, the movement mechanism 21 includes an annular core 22, plural rollers 23, a first actuator 24 (see FIG. 3), a second actuator 25 (see FIG. 3), and so forth.

The plural rollers 23 are inserted from the outside of the core 22 so as to be aligned at equivalent angular intervals in a circumferential direction (a direction around an axial center) of the core 22, and each of the plural rollers 23 is capable of integrally rotating with the core 22 around the axial center of the core 22. Further, each of the rollers 23 is capable of rotating around a central axis of a transverse cross section of the core 22 in an arrangement position of each of the rollers 23 (an axis in the tangential direction of a circumference having the axial center of the core 22 as the center).

In addition, the first actuator 24 is configured with an electric motor and drives and rotates the core 22 around its axial center via a drive mechanism, which is not illustrated, when a control input signal described later is input from the control device 10.

Meanwhile, similarly to the first actuator 24, the second actuator 25 is also configured with an electric motor and drives and rotates the rollers 23 around their axial centers via a drive mechanism, which is not illustrated, when a control input signal is input from the control device 10. Accordingly, the body 20 is driven by the first actuator 24 and the second actuator 25 so as to move in all bearings on a road surface. The above configuration enables the robot 2 to move in all bearings on a road surface.

Figure 3:
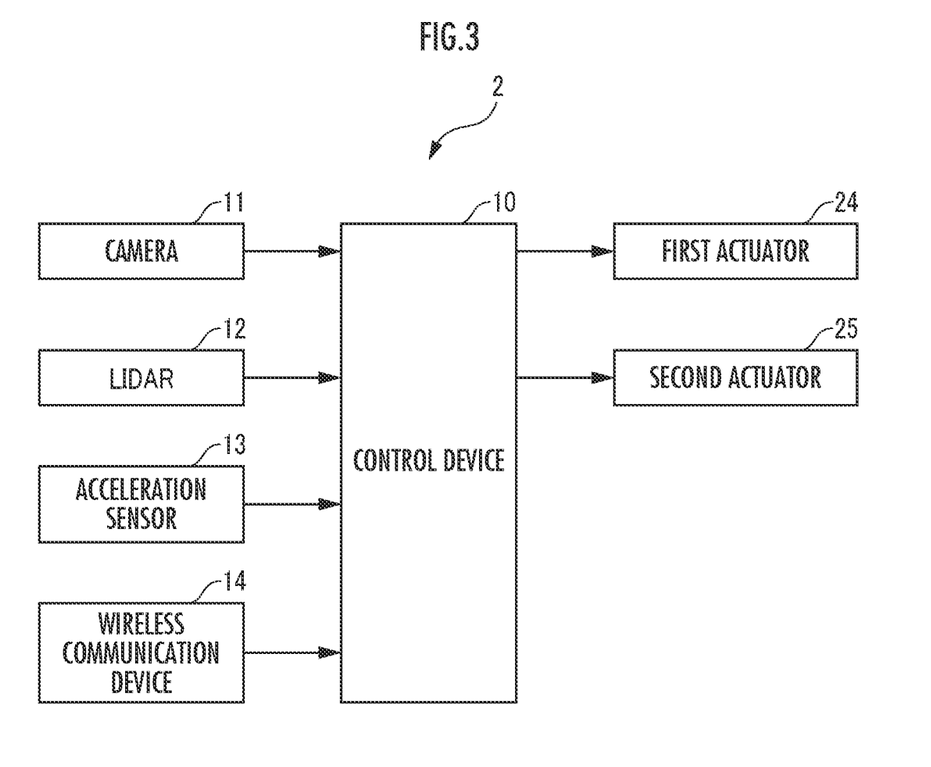
FIG. 3 is a block diagram illustrating an electrical configuration of the robot.

Next, an electrical configuration of the robot 2 will be described. As illustrated in FIG. 3, the robot 2 further includes the control device 10, a camera 11, a LIDAR 12, an acceleration sensor 13, and the wireless communication device 14.

This control device 10 (control unit) is configured with a microcomputer formed with a CPU, a RAM, a ROM, an E2PROM, an I/O interface, various kinds of electrical circuits (all not illustrated), and so forth. In this E2PROM, map data of a place in which the robot 2 performs guidance and a CNN (convolutional neural network) are stored. In this case, as the CNN, a CNN is stored for which model parameters of the CNN, that is, weights and bias terms among connected layers have been sufficiently learned by a learning device 30 described later.

The camera 11 captures an image of a surrounding environment of the robot 2 and outputs an image signal indicating the image to the control device 10. Further, the LIDAR 12 uses laser light to measure a distance or the like to an object in the surrounding environment and outputs a measurement signal indicating the distance or the like to the control device 10. In addition, the acceleration sensor 13 detects acceleration of the robot 2 and outputs a detection signal indicating the acceleration to the control device 10.

The control device 10 uses the image signal by the camera 11 and the measurement signal by the LIDAR 12, which are described above, to estimate the own position of the robot 2 by an amcl (adaptive Monte Carlo localization) method. Further, the control device 10 calculates an x-axis velocity v_x and a y-axis velocity v_y of the robot 2, which will be described later, based on the measurement signal by the LIDAR 12 and the detection signal by the acceleration sensor 13.

In addition, the wireless communication device 14 is electrically connected with the control device 10, and the control device 10 executes wireless communication with the server 5 via this wireless communication device 14.

Figure 4:
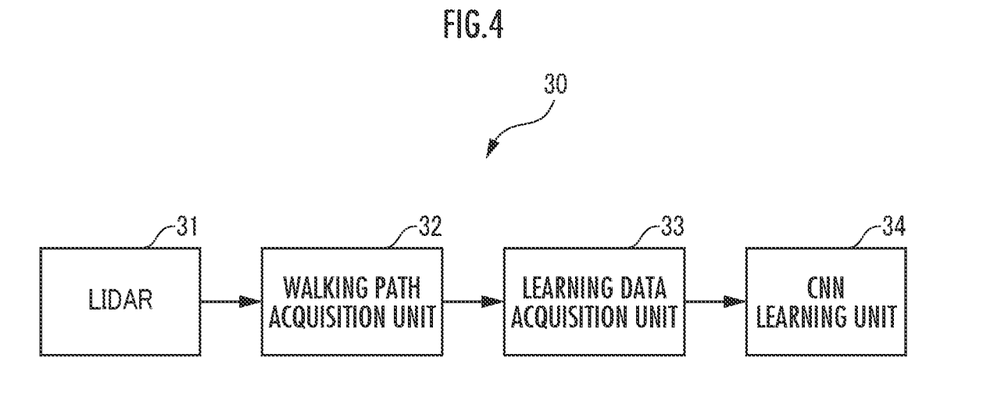
FIG. 4 is a block diagram illustrating a configuration of a learning device.

Next, a description will be made about a configuration of the path determination device 1 and the principle of a path determination method of the present embodiment. First, the learning device 30 illustrated in FIG. 4 will be described. This learning device 30 is for learning the model parameters (weights and bias terms among the connected layers) of the CNN, which will be described later, and includes a LIDAR 31, a walking path acquisition unit 32, a learning data acquisition unit 33, and a CNN learning unit 34. Those elements 32 to 34 are, specifically, configured with controllers and so forth, which are not illustrated.

Figure 5:
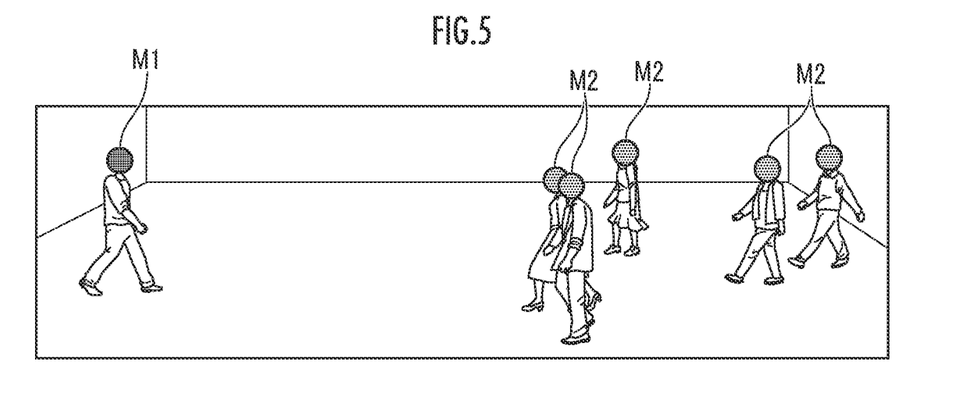
FIG. 5 is a perspective view in acquisition of a walking path of a first pedestrian.

First, in order to learn a walking path of a common pedestrian, as illustrated in FIG. 5, a first pedestrian M1 is set as a reference pedestrian, and a traffic environment of a crowd is set in which in a case where this first pedestrian M1 walks from a walking start point Ps (see FIG. 6) to a destination point Po (see FIG. 6), at the start of walking, plural second pedestrians M2 are present in irregular arrangement in a traveling direction of the first pedestrian M1.

Next, the LIDAR 31 is used to measure a change in position in a case where the first pedestrian M1 actually walks from the walking start point Ps to the destination point Po and changes in position of the plural second pedestrians M2, and the measurement results are output to the walking path acquisition unit 32.

Figure 6:
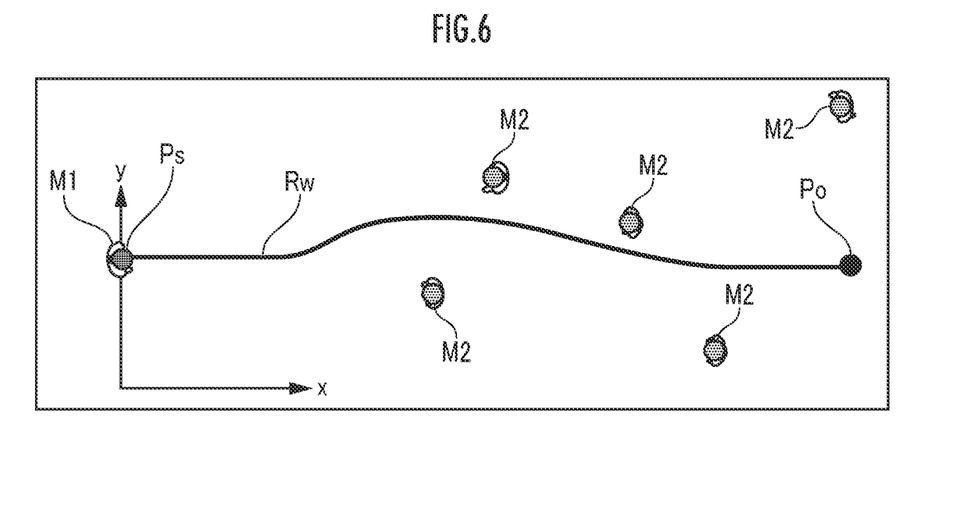
FIG. 6 is a diagram illustrating one example of an acquisition result of the walking path in FIG. 5.
Figure 7:
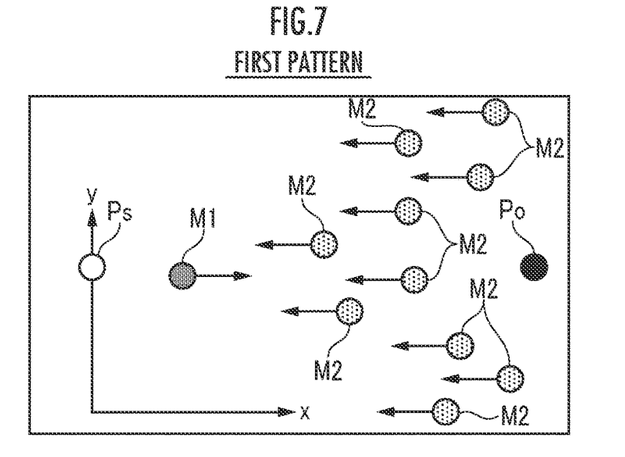
FIG. 7 is a diagram illustrating a first pattern of arrangement of second pedestrians in a case where acquisition of walking paths is started.
Figure 8:
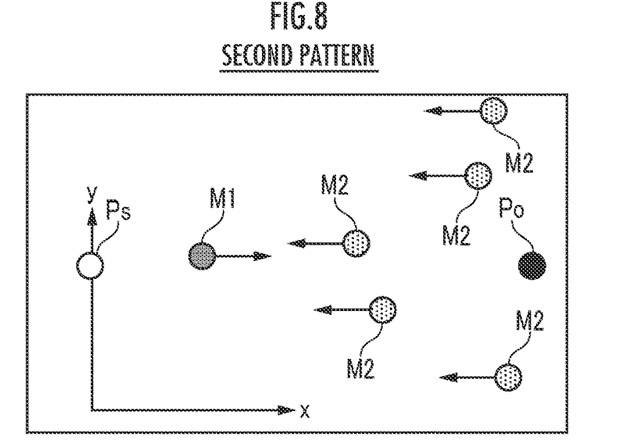
FIG. 8 is a diagram illustrating a second pattern of arrangement of the second pedestrians.

Then, based on the measurement results of the LIDAR 31, the walking path acquisition unit 32 sequentially acquires and stores a walking path Rw of the first pedestrian M1 from the walking start point Ps to the destination point Po as illustrated in FIG. 6, for example. As illustrated in FIG. 6, the walking path Rw of the first pedestrian M1 is acquired as two-dimensional x-y coordinate values in a case where an axis extending in a traveling direction of the first pedestrian M1 is defined as an x axis and an axis orthogonal to the traveling direction of the first pedestrian M1 is defined as a y axis. Note that the definitions of the x axis and y axis in the following descriptions are the same as FIG. 6.

The origin of the x axis is set to the walking start point Ps of the first pedestrian M1, and the origin of the y axis is set to a predetermined position on the right side of the traveling direction of the first pedestrian M1. In addition, the positions of the second pedestrians M2 in the period in which the first pedestrian M1 starts from the walking start point Ps and reaches the destination point Po are acquired by the walking path acquisition unit 32 while being associated with the walking path Rw of the first pedestrian M1.

In addition to this, the walking path acquisition unit 32 acquires the walking path Rw of the first pedestrian M1 while walking patterns of the second pedestrians M2 are switched to first to seventh patterns which are respectively illustrated in FIGS. 7 to 13. In this case, the first and second patterns are, as respectively illustrated in FIG. 7 and FIG. 8, patterns in which 10 second pedestrians M2 and 5 second pedestrians M2 walk toward the first pedestrian M1 side in parallel with the x axis while respective parts of the second pedestrians M2 pass by the first pedestrian M1.

Figure 9:
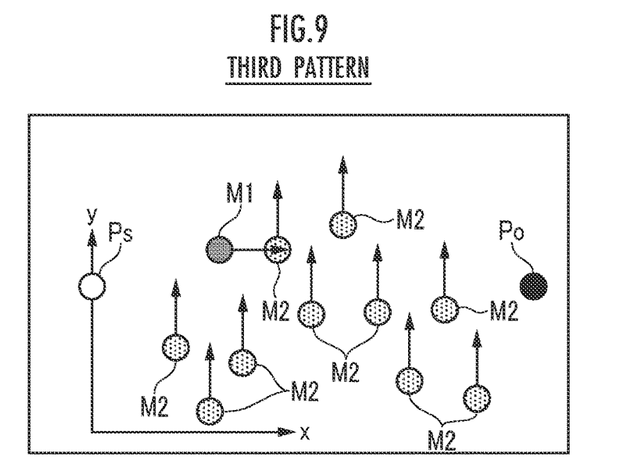
FIG. 9 is a diagram illustrating a third pattern of arrangement of the second pedestrians.
Figure 10:
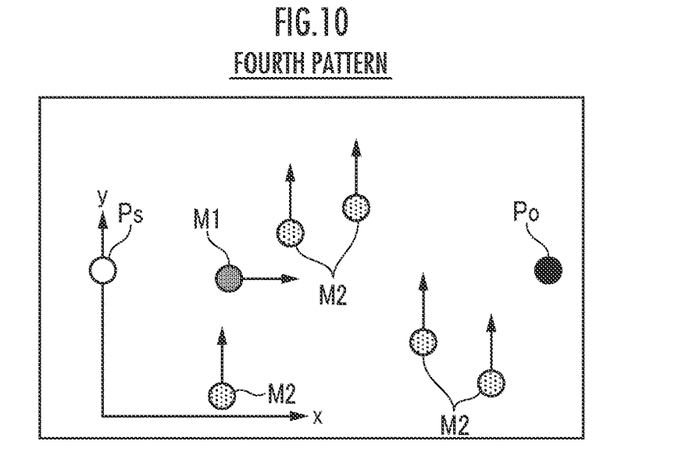
FIG. 10 is a diagram illustrating a fourth pattern of arrangement of the second pedestrians.
Figure 11:
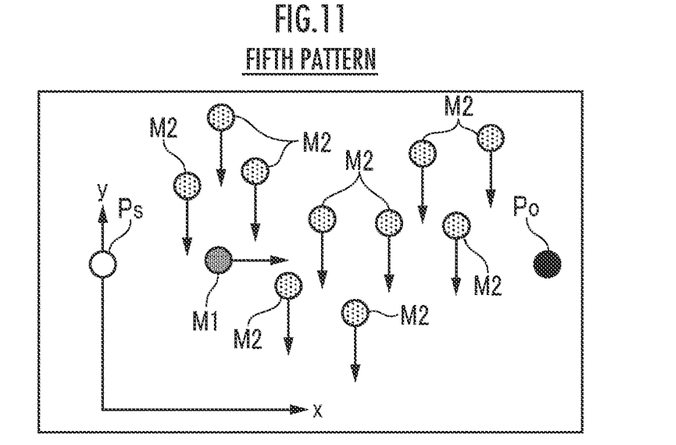
FIG. 11 is a diagram illustrating a fifth pattern of arrangement of the second pedestrians.
Figure 12:
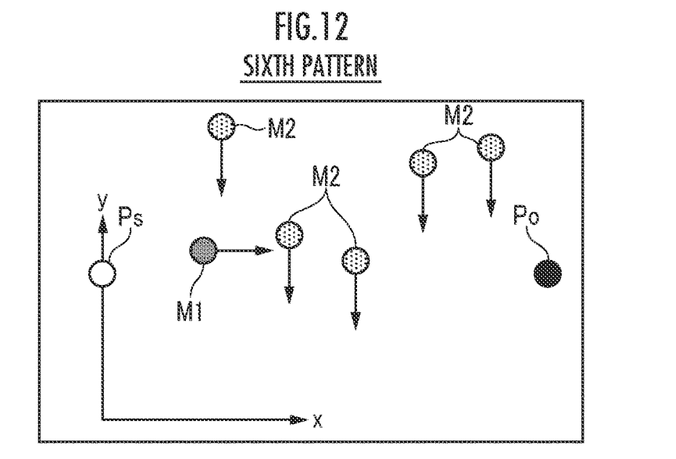
FIG. 12 is a diagram illustrating a sixth pattern of arrangement of the second pedestrians.

Further, the third and fourth patterns are, as respectively illustrated in FIG. 9 and FIG. 10, patterns in which 10 second pedestrians M2 and 5 second pedestrians M2 walk from the right side to the left side of the first pedestrian M1 while respective parts of the second pedestrians M2 intersect with the first pedestrian M1. In addition, the fifth and sixth patterns are, as respectively illustrated in FIG. 11 and FIG. 12 and inversely to the third and fourth patterns, patterns in which 10 second pedestrians M2 and 5 second pedestrians M2 walk from the left side to the right side of the first pedestrian M1 while respective parts of the second pedestrians M2 intersect with the first pedestrian M1.

Figure 13:
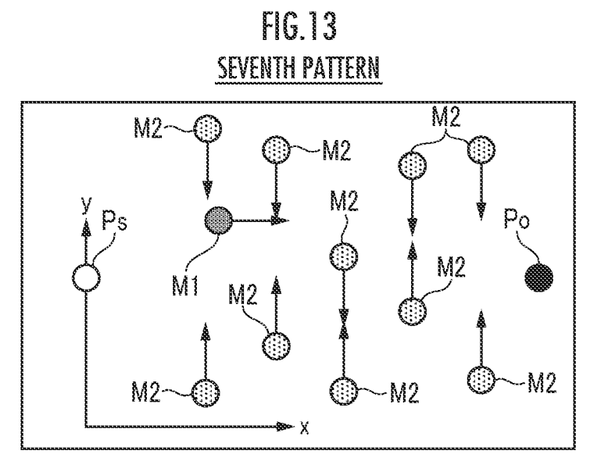
FIG. 13 is a diagram illustrating a seventh pattern of arrangement of the second pedestrians.

In addition to those, as illustrated in FIG. 13, the seventh pattern is a pattern in which 5 second pedestrians among 10 second pedestrians M2 walk from the right side to the left side of the first pedestrian M1, the remaining 5 second pedestrians M2 walk from the left side to the right side of the first pedestrian M1, and respective parts of the second pedestrians M2 walk while intersecting with the first pedestrian M1.

As described above, the walking path acquisition unit 32 acquires the walking path Rw of the first pedestrian M1 while the walking pattern Rw is associated with the positions of the second pedestrians M2, and those acquisition results are output to the learning data acquisition unit 33.

When an acquisition result such as the walking path Rw is input from the walking path acquisition unit 32, the learning data acquisition unit 33 acquires and creates learning data based on the acquisition result by a procedure described in the following. First, under a simulation environment by a Gazebo simulator or the like, virtual second pedestrians M2' (see FIG. 14) corresponding to the above-described second pedestrians M2 and a virtual robot (not illustrated) corresponding to the robot 2 are created.

Next, while the virtual robot is caused to move to follow the above-described walking path Rw of the first pedestrian M1, the virtual second pedestrians M2' are caused to move in accordance with the positions of the second pedestrians M2 which are acquired by the walking path acquisition unit 32.

Figure 14:
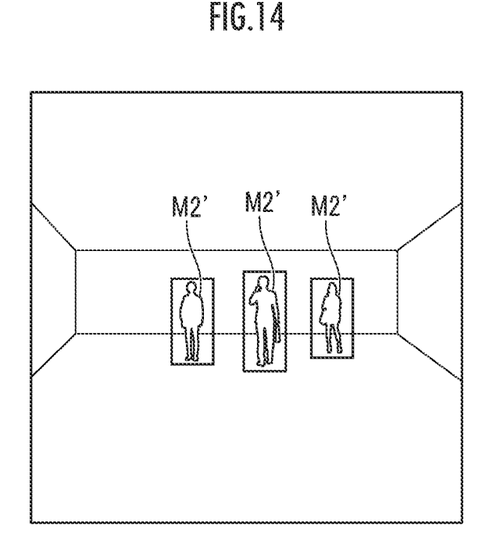
FIG. 14 is a diagram illustrating an image in a viewpoint of a virtual robot under a simulation environment.

In the movement, an image of a visual environment in front of the virtual robot is sampled in predetermined cycles, and based on the sampling results, mask images are sequentially created by an SSD (single shot multibox detector) method. For example, as illustrated in FIG. 14, in a case where three virtual second pedestrians MT are positioned in front of the virtual robot under a simulation environment, the positions of the three virtual second pedestrians MT are acquired by the SSD method, and a mask image illustrated in FIG. 15 is thereby created.

Figure 15:
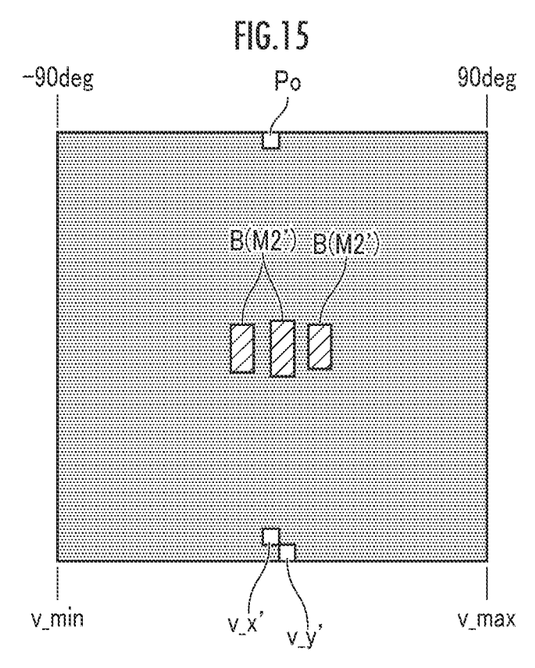
FIG. 15 is a diagram illustrating a mask image created from the image of FIG. 14.

As illustrated in FIG. 15, in this mask image, the positions of the three virtual second pedestrians M2' are displayed as three rectangular boxes B. In FIG. 15, regions of the three boxes B which are indicated by diagonal lines are actually displayed in red, and the other dotted region than those is actually displayed in black.

Simultaneously with this, in an upper end portion of the mask image, the destination point Po in the sampling is displayed as a white rectangular box. This destination point Po is set as a value within a range of −90 deg to 90 deg while the central position in front is set as 0 deg when the own position of the virtual robot at the present time is set as a reference.

In addition, at a lower end of this mask image, a virtual x-axis velocity v_x' and a virtual y-axis velocity v_y' of the virtual robot in the sampling are displayed as two white rectangular boxes. Those virtual x-axis velocity v_x' and virtual y-axis velocity v_y' are respective velocity components in an x-axis direction and a y-axis direction of the virtual robot and are set as values within a range of a minimum moving velocity v_min (for example, a value of zero) to a maximum moving velocity v_max of the virtual robot. The x-axis direction and y-axis direction of the virtual robot in this case are defined in the same manner as above-described FIG. 7 and so forth.

In addition to this, the learning data acquisition unit 33 sets a moving direction command for the virtual robot in the sampling as a vector value having three directions of "left direction", "central direction", and "right direction" as elements. In a case of this moving direction command, for example, when the virtual robot travels straight, the "central direction" is set to a value of one, and the other directions which are the "left direction" and "right direction" are set to a value of zero.

Further, when the virtual robot moves in the right direction, the "right direction" is set to a value of one, and the other directions are set to a value of zero. In this case, the "right direction" is set to a value of one when the virtual robot moves in a right-side direction at a predetermined angle θ or more with respect to a straight traveling direction. In addition, when the virtual robot moves in the left direction, the "left direction" is set to a value of one, and the other directions are set to a value of zero. In this case, the "left direction" is set to a value of one when the virtual robot moves in a left-side direction at a predetermined angle θ or more with respect to the straight traveling direction.

Next, the learning data acquisition unit 33 sequentially creates one set of data, in which the above-described mask image (see FIG. 15) and the moving direction command are associated together, as the learning data in the above-described predetermined cycle. Then, finally, at a timing when numerous sets (several thousand sets or more) of learning data are created, those sets of learning data are output to the CNN learning unit 34. Note that the learning data acquisition unit 33 may be configured to output the learning data to the CNN learning unit 34 at each time when the learning data are created in the predetermined cycle.

When the numerous sets of learning data are input from the learning data acquisition unit 33, the CNN learning unit 34 uses those sets of learning data to execute learning of the model parameters of the CNN. Specifically, the mask image in one set of learning data is input to the CNN, and for an output of the CNN in this case, the moving direction command is used as training data.

In this case, an output layer of the CNN is configured with three units, and a command having three softmax values from those three units as elements (hereinafter referred to as "CNN output command") is output from the CNN. This CNN output command is configured with a command having the same three directions ("left direction", "central direction", and "right direction") as the moving direction command as elements.

Next, by using a loss function (for example, the mean squared error) between the moving direction command and the CNN output command, the weights and bias terms among the connected layers of the CNN are computed by a gradient method. That is, learning computation of the model parameters of the CNN is executed. Then, the above learning computation is executed for the number of sets of learning data (that is, several thousand times), and the learning computation of the model parameters of the CNN in the CNN learning unit 34 is thereby finished. In this learning device 30, learning of the model parameters of the CNN is executed as described above.

Next, configurations of the path determination device 1 and so forth of the present embodiment will be described with reference to FIG. 16. The path determination device 1 determines (calculates) a moving velocity command v as the path of the robot 2 by a procedure described in the following, and this moving velocity command v has a target x-axis velocity v_x_cmd and a target y-axis velocity v_y_cmd, which are targets of the x-axis velocity v_x and y-axis velocity v_y of the robot 2, as elements.

Figure 16:
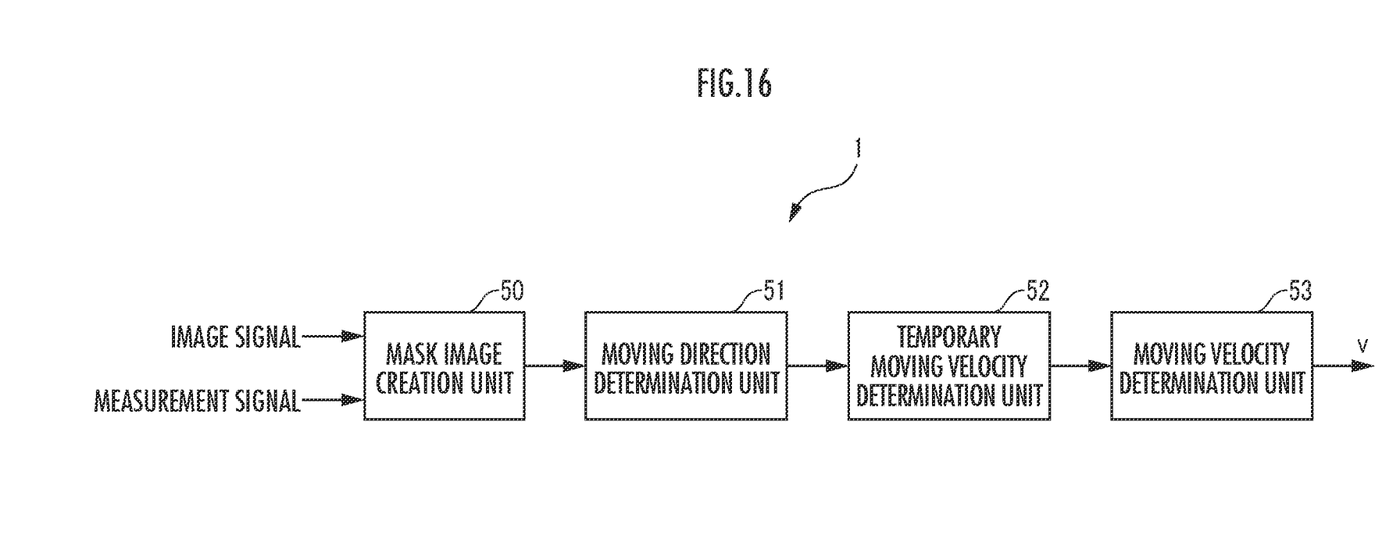
FIG. 16 is a block diagram illustrating functions of the path determination device and so forth.

As illustrated in FIG. 16, the path determination device 1 includes a mask image creation unit 50, a moving direction determination unit 51, a temporary moving velocity determination unit 52, and a moving velocity determination unit 53, and specifically, those elements 50 to 53 are configured with the control device 10. Note that it is assumed that various kinds of control processes described in the following are executed in a predetermined control cycle ΔT.

First, the mask image creation unit 50 will be described. When the image signal from the camera 11 and the measurement signal from the LIDAR 12 are input, this mask image creation unit 50 creates a mask image by the above-described SSD method.

In this mask image, similarly to the above-described box B in the mask image in FIG. 15, a box (not illustrated) of a traffic participant in front is displayed, and instead of the virtual x-axis velocity v_x', the virtual y-axis velocity v_y', and the destination point Po, the x-axis velocity v_x and y-axis velocity v_y of the robot 2 and the destination Pobj (all not illustrated) are displayed.

In this case, the position and size of the traffic participant are determined based on the image signal by the camera 11 and the measurement signal by the LIDAR 12. Further, the x-axis velocity v_x and y-axis velocity v_y of the robot 2 are determined based on the measurement signal by the LIDAR 12 and the detection signal by the acceleration sensor 13. In addition, the destination Pobj is determined by the destination signal from the server 5. The mask image created as described above is output from the mask image creation unit 50 to the moving direction determination unit 51.

The moving direction determination unit 51 includes a CNN (not illustrated) for which the model parameters are learned by the above-described CNN learning unit 34 and uses this CNN to determine a moving direction of the robot 2 as described in the following.

First, in the moving direction determination unit 51, when the mask image from the mask image creation unit 50 is input to the CNN, the above-described CNN output command is output from the CNN. Next, among the three elements ("left direction", "central direction", and "right direction") of the CNN output command, the direction of the element with the maximum value is determined as the moving direction of the robot 2. Then, the moving direction of the robot 2 which is determined as described above is output from the moving direction determination unit 51 to the temporary moving velocity determination unit 52.

This temporary moving velocity determination unit 52 calculates a temporary moving velocity command v_cnn based on the moving direction of the robot 2 from the moving direction determination unit 51 and the x-axis velocity v_x and y-axis velocity v_y of the robot 2. This temporary moving velocity command v_cnn has a temporary value v_x_cnn of the x-axis velocity and a temporary value v_y_cnn of the y-axis velocity of the robot 2 as elements. Next, the temporary moving velocity command v_cnn for the robot 2 which is determined as described above is output from the temporary moving velocity determination unit 52 to the moving velocity determination unit 53.

This moving velocity determination unit 53 determines the moving velocity command v based on the temporary moving velocity command v_cnn by an algorithm to which a DWA (dynamic window approach) is applied. This moving velocity command v has the target x-axis velocity v_x_cmd and the target y-axis velocity v_y_cmd as elements, and those two velocities v_x_cmd and v_y_cmd are used as target values of the x-axis velocity and y-axis velocity of the robot 2 in a movement control process described later.

Specifically, as expressed in the following formula (1), an objective function G(v) is defined, and the moving velocity command v is determined such that this objective function G(v) becomes the maximum value.

$$G(v) = \alpha \cdot cnn(v) + \beta \cdot dist(v) \quad (1)$$

The terms $\alpha$ and $\beta$ in the above formula (1) denotes predetermined weight parameters and are determined based on dynamic characteristics of the robot 2. Further, the term cnn(v) in the above formula (1) denotes a function value which has the deviation between a velocity command having the x-axis velocity and y-axis velocity in a dynamic window as elements and the temporary moving velocity command v_cnn as an independent variable and which exhibits a greater value as this independent variable becomes smaller.

In addition, the term dist(v) in the above formula (1) denotes a value which represents the distance to a traffic participant closest to the robot 2 on the assumption that the robot 2 moves at the temporary value v_x_cnn of the x-axis velocity and the temporary value v_y_cnn of the y-axis velocity and is determined based on the measurement signal by the LIDAR 12.

Note that in the present embodiment, the moving direction determination unit 51 and the temporary moving velocity determination unit 52 correspond to a predicted path determination unit, and determination of the temporary moving velocity command v_cnn (that is, the temporary value v_x_cnn of the x-axis velocity and the temporary value v_y_cnn of the y-axis velocity) corresponds to determination of a predicted path. In addition, the moving velocity determination unit 53 corresponds to a path determination unit, and the temporary value v_x_cnn of the x-axis velocity and the temporary value v_y_cnn of the y-axis velocity correspond to a velocity of the robot.

In the path determination device 1 of present embodiment, as described above, the moving velocity command v is determined which has the target x-axis velocity v_x_cmd and the target y-axis velocity v_y_cmd as the elements.

Next, the movement control process will be described with reference to FIG. 17. This movement control process is for controlling the two actuators 24 and 25 of the movement mechanism 21 such that the robot 2 moves at the above-described two target velocities v_x_cmd and v_y_cmd and is executed in the predetermined control cycle ΔT by the control device 10.

Figure 17:
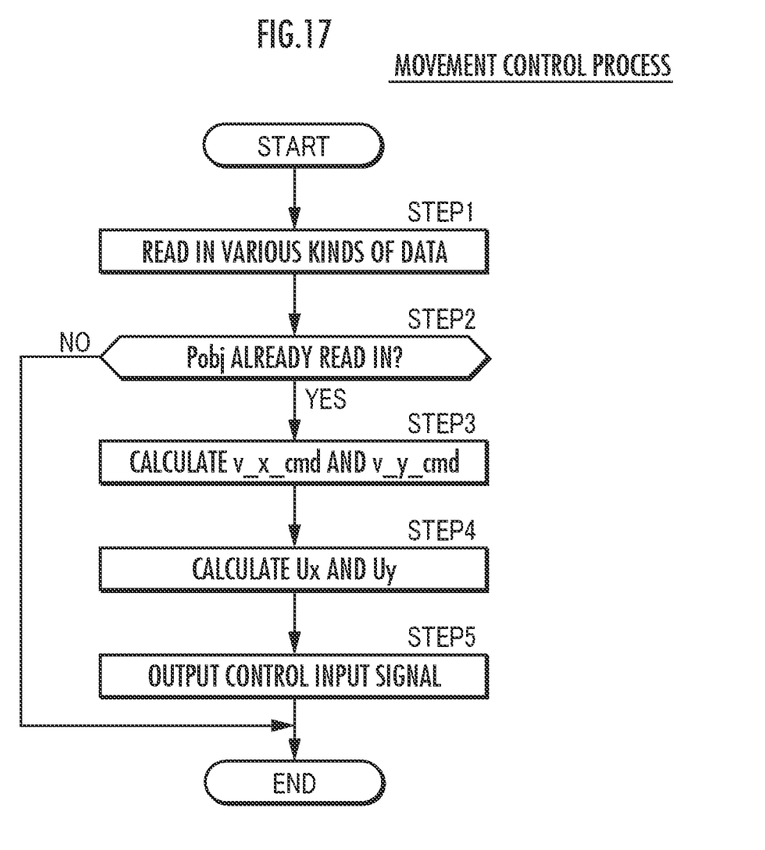
FIG. 17 is a flowchart illustrating a movement control process.

As illustrated in FIG. 17, first, various kinds of data are read in (STEP 1 in FIG. 17). The various kinds of data are signal data input from the above-described camera 11, LIDAR 12, acceleration sensor 13, and wireless communication device 14 to the control device 10.

Next, it is assessed whether or not the destination Pobj included in the above-described destination signal is already read in (STEP 2 in FIG. 17). When this assessment turns out to be negative (STEP 2 in FIG. 17: NO), that is, when the destination signal is not yet received from the server 5, this process is finished without any change.

On the other hand, when this assessment turns out to be affirmative (STEP 2 in FIG. 17: YES), the target x-axis velocity v_x_cmd and the target y-axis velocity v_y_cmd are calculated by the above-described procedure of FIG. 16 (STEP 3 in FIG. 17).

Next, an x-axis control input Ux and a y-axis control input Uy are calculated, by a predetermined control algorithm, in accordance with the target x-axis velocity v_x_cmd and the target y-axis velocity v_y_cmd (STEP 4 in FIG. 17). In this case, as the predetermined control algorithm, a feedforward control algorithm such as map search or a feedback control algorithm may be used.

Next, a control input signal corresponding to the x-axis control input Ux is output to the first actuator 24, and a control input signal corresponding to the y-axis control input Uy is output to the second actuator 25 (STEP 5 in FIG. 17). Subsequently, this process is finished. Accordingly, control is performed such that the actual x-axis velocity v_x and y-axis velocity v_y of the robot 2 become the target x-axis velocity v_x_cmd and target y-axis velocity v_y_cmd. As a result, the robot 2 moves toward the destination Pobj along a path determined by those target velocities v_x_cmd and v_y_cmd while dodging traffic participants in front.

As described above, in the path determination device 1 of the present embodiment, the mask image is input to the CNN, the CNN output command is thereby output from the CNN, the direction with the element at the maximum value among the three elements of the CNN output command is determined as the moving direction of the robot 2. In this case, as described above, the model parameters of the CNN are model parameters which are sufficiently learned in the learning device 30 by using the mask image and the moving direction command.

Further, those mask image and moving direction command are created based on an image in a viewpoint of the virtual robot and the moving direction of the virtual robot in a case where the walking path Rw in a case where the first pedestrian M1 actually walks while dodging the plural second pedestrians M2 is sampled and the virtual robot thereafter moves along this walking path Rw in a virtual space. Consequently, by using such a CNN, the moving direction of the robot 2 can be determined such that an interference between the robot 2 and the traffic participant is avoided.

In addition, the temporary moving velocity command v_cnn is calculated based on this moving direction of the robot 2 and the x-axis velocity v_x and y-axis velocity v_y of the robot 2. Then, by using the algorithm to which the DWA is applied, the moving velocity command v which has the target x-axis velocity v_x_cmd and the target y-axis velocity v_y_cmd as the elements is determined such that the objective function G(v) of the above-described formula (1) becomes the maximum value. Accordingly, in a case where it is assumed that the robot 2 moves in the moving direction determined by using the CNN, the target x-axis velocity v_x_cmd and the target y-axis velocity v_y_cmd can be determined such that the distance to the traffic participant closest to the robot 2 and a moving velocity of the robot 2 are secured as much as possible and in a proper balance.

As a result, even under a traffic condition such as a crowd in which an error in the moving direction determined by using the CNN becomes large, the path (target x-axis velocity v_x_cmd and target y-axis velocity v_y_cmd) of the robot 2 can be determined such that the autonomous mobile robot 2 smoothly moves to the destination Pobj while avoiding interferences with traffic participants. Accordingly, occurrence of a state where the robot 2 interferes with a traffic participant can be decreased, and merchantability can be improved.

Further, compared to other methods, the DWA has characteristics capable of shortening a time needed for path determination for the robot 2 and of reducing a computation load. Consequently, by using the algorithm to which such a DWA is applied, the path of the robot 2 can be determined while realizing shortening of the time needed for path determination and reduction in the computation load.

Note that the embodiment is an example where the robot 2 is used as an autonomous mobile robot; however, a robot of the present invention is not limited to this but may be of any autonomous mobile type. For example, a vehicle type robot or a biped walking robot may be used.

Further, the embodiment is an example where the CNN is used as a predetermined prediction algorithm; however, a prediction algorithm of the present invention is not limited to this but may be a prediction algorithm that can determine a predicted path as a predicted value of the path of the robot. For example, as a predetermined prediction algorithm, an RNN (recurrent neural network), a DQN (deep Q-network), or the like may be used.

In addition, the embodiment is an example where the movement mechanism 21 including the core 22 and the plural rollers 23 is used as a movement mechanism; however, a movement mechanism of the present invention is not limited to this but may be a mechanism capable of causing a robot to move in all bearings. For example, as a movement mechanism, a mechanism may be used which has a configuration in which a sphere and plural rollers are combined together, those rollers rotate and drive the sphere, and a robot is thereby caused to move in all bearings.

Further, the embodiment is an example where the CNN is stored in the E2PROM of the control device 10 of the robot 2; however, a configuration may be made such that the CNN is stored on the server 5 side, computation for path determination is conducted on the server 5 side, and this is transmitted to the robot 2.

Meanwhile, the embodiment is an example where the moving velocity determination unit 53 calculates, as the moving velocity of the robot 2, the moving velocity command v having the x-axis velocity v_x and y-axis velocity v_y as the elements by a DWA method; however, instead of this, the moving velocity determination unit 53 may calculate, as the moving velocity of the robot 2, the x-axis velocity v_x and an angular velocity ω by the DWA method.

Further, the embodiment is an example where the walking path acquisition unit 32 uses the first to seventh patterns as the walking patterns of the second pedestrians M2; however, the walking path Rw of the first pedestrian M1 may be acquired by using a walking pattern in which the number of second pedestrians M2 and their moving directions are changed to those different from the above patterns. For example, a pattern in which plural second pedestrians M2 and plural second pedestrians M2 walk while obliquely intersecting with one another, a pattern in which plural second pedestrians M2 walk along an x-axis line, plural second pedestrians M2 walk along a y-axis line, and they thereby intersect with one another, and so forth may be used.

REFERENCE SIGNS LIST 1 path determination device
2 robot
10 control device (control unit)
21 movement mechanism
51 moving direction determination unit (predicted path determination unit)
52 temporary moving velocity determination unit (predicted path determination unit)
53 moving velocity determination unit (path determination unit)
Pobj destination
v_x_cnn temporary value of x-axis velocity (predicted path, velocity of robot)
v_y_cnn temporary value of y-axis velocity (predicted path, velocity of robot)
dist value representing distance to closest traffic participant
G objective function

The invention claimed is:

1. A robot comprising:
a path determination device; and
a control unit, wherein
the path determination device determines a path in a case where the robot, which is an autonomous mobile robot, moves to a destination under a condition in which a traffic participant including a pedestrian is present in a traffic environment to the destination, the path determination device comprising:
    a predicted path determination unit which determines a predicted path as a predicted value of a path of the robot, by using a predetermined prediction algorithm, such that an interference between the robot and the traffic participant is avoided; and
    a path determination unit which determines the path of the robot, by using a predetermined control algorithm, such that in a case where the robot is assumed to move in the predicted path from a present position, an objective function including a distance to the traffic participant closest to the robot and a velocity of the robot as independent variables becomes a maximum value, and
the control unit controls a movement mechanism of the robot such that the robot moves in the path determined by the path determination device.

2. The robot according to claim 1, wherein
the predetermined control algorithm is an algorithm to which a dynamic window approach is applied.

3. A robot control method of determining a path in a case where an autonomous mobile robot moves to a destination under a condition in which a traffic participant including a pedestrian is present in a traffic environment to the destination, the robot control method comprising:
determining a predicted path as a predicted value of a path of the robot, by using a predetermined prediction algorithm, such that an interference between the robot and the traffic participant is avoided;
determining the path of the robot, by using a predetermined control algorithm, such that in a case where the robot is assumed to move in the predicted path from a present position, an objective function including a distance to the traffic participant closest to the robot and a velocity of the robot as independent variables becomes a maximum value; and controlling a movement mechanism of the robot such that the robot moves in the determined path.

4. The robot control method according to claim 3, wherein the predetermined control algorithm is an algorithm to which a dynamic window approach is applied.

* * * * *